US011429578B2

(12) United States Patent
Saba et al.

(10) Patent No.: US 11,429,578 B2
(45) Date of Patent: Aug. 30, 2022

(54) CUSTOM TAG DEFINITION AND TRANSLATION IN A DATABASE

(71) Applicant: International Business Machines Corporation, Armonk, NY (US)

(72) Inventors: Raul E. Saba, Tucson, AZ (US); Scott Brewer, Tucson, AZ (US); Gregory T. Kishi, Oro Valley, AZ (US); Sara Megan Coronado, Tucson, AZ (US); Drew Olson, Tucson, AZ (US); Joseph W. Dain, Vail, AZ (US); Theodore Timothy Harris, Jr., Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 15 days.

(21) Appl. No.: 16/952,974

(22) Filed: Nov. 19, 2020

(65) Prior Publication Data

US 2022/0156239 A1    May 19, 2022

(51) Int. Cl.
  *G06F 16/22* (2019.01)
  *G06F 16/2457* (2019.01)
  *G06F 16/2452* (2019.01)
  *G06F 16/23* (2019.01)
  *G06F 16/28* (2019.01)

(52) U.S. Cl.
  CPC ........ *G06F 16/221* (2019.01); *G06F 16/2282* (2019.01); *G06F 16/2291* (2019.01); *G06F 16/2358* (2019.01); *G06F 16/24524* (2019.01); *G06F 16/24573* (2019.01); *G06F 16/284* (2019.01)

(58) Field of Classification Search
  CPC .............................. G06F 16/254; G06F 16/283
  USPC ........................................................ 707/722
  See application file for complete search history.

(56) References Cited

U.S. PATENT DOCUMENTS

| 9,740,774 | B2 | 8/2017 | Chaney et al. | |
| 2011/0078204 | A1 | 3/2011 | Lotikar et al. | |
| 2014/0114907 | A1* | 4/2014 | Kozina | G06F 16/283 |
| | | | | 707/602 |
| 2017/0116295 | A1* | 4/2017 | Wan | G06F 16/254 |
| 2019/0188302 | A1* | 6/2019 | Milby | G06F 16/285 |
| 2020/0356594 | A1* | 11/2020 | Liu | G06F 16/8373 |

FOREIGN PATENT DOCUMENTS

| CN | 103970899 A | 8/2014 |
| CN | 109344306 A | 2/2019 |

* cited by examiner

*Primary Examiner* — Hung T Vy
(74) *Attorney, Agent, or Firm* — Patterson + Sheridan, LLP

(57) ABSTRACT

A method includes generating a table in a relational database, the table comprising an empty column reserved for a custom tag. The column has a default column name. The method also includes, in response to an instruction to create the custom tag, generating a column mapping that maps a name of the custom tag to the column name. The column mapping is stored outside the relational database and is used by a parser to translate between the name of the custom tag and the column name.

17 Claims, 7 Drawing Sheets

| ATTRIBUTE NAME | METRIC 1 | METRIC 2 | RESERVED COLUMN 1 | RESERVED COLUMN 2 |
|---|---|---|---|---|
| A | 0 | 4 | | |
| B | 1 | 5 | | |
| C | 2 | 6 | | |
| D | 3 | 7 | | |

TABLE 112

| ATTRIBUTE NAME | METRIC 1 | METRIC 2 | RESERVED COLUMN 1 | RESERVED COLUMN 2 |
|---|---|---|---|---|
| A | 0 | 4 | 8 | |
| B | 1 | 5 | 9 | |
| C | 2 | 6 | 10 | |
| D | 3 | 7 | 11 | |

FIG. 4

CUSTOM TAG DEFINITION AND TRANSLATION IN A DATABASE

BACKGROUND

The present invention relates to database technologies, and more specifically, to custom tags definition and translation. Users may store information in tables in a database (e.g., a relational database) and then retrieve that information by issuing queries against the database. Once the tables are generated and populated with information, however, it may be very resource intensive for the user to generate custom tags for that information, because new columns would need to be added to the tables to accommodate the custom tags. Adding even one column to a very large table is not a trivial task and may require a significant amount of computing resources (e.g., processor, memory, or network resources) to complete. As a result, the process may be slow and sometimes, there may not be sufficient resources available to complete the process, leading to failure.

SUMMARY

According to one embodiment, a method includes generating a table in a relational database, the table comprising an empty column reserved for a custom tag. The column has a default column name. The method also includes, in response to an instruction to create the custom tag, generating a column mapping that maps a name of the custom tag to the column name. The column mapping is stored outside the relational database and is used by a parser to translate between the name of the custom tag and the column name. In this manner, a user can quickly define and store custom tags as needed without requiring the relational database to create new table columns.

The method may include parsing, by the parser, a received search query for the relational database to identify the name of the custom tag in the search query, in response to identifying the name of the custom tag in the search query, translating, based on the column mapping, the name of the custom tag in the search query into the column name to produce a translated query, and issuing the translated query to the relational database rather than the search query. In this manner, a user can query a custom tag based on the name for the custom tag provided by the user without changing column names in a table.

The method may include parsing, by the parser, a received response from the relational database to identify the column name in the response, in response to identifying the column name in the response, translating, based on the column mapping, the column name into the name of the custom tag to produce a translated response, and displaying the translated response rather than the received response. In this manner, a user can view a custom tag based on the name for the custom tag provided by the user without changing column names in a table.

The table may include a second column comprising user data. In this manner, the table stores both user data and custom tags.

The method may include populating an entry in the column in response to an instruction to add the entry to the column. In this manner, a user may add information to columns reserved for custom tags.

The method may include removing every entry from the column except the column name in response to an instruction to delete the custom tag and deleting the column mapping in response to the instruction to delete the custom tag. In this manner, the user may remove custom tags.

The table may include a plurality of reserved columns. In this manner, the table can store multiple custom tags.

BRIEF DESCRIPTION OF THE SEVERAL VIEWS OF THE DRAWINGS

FIG. 2 illustrates an example table in the system of FIG. 1;

FIG. 4 illustrates an example table in the system of FIG. 1;

DETAILED DESCRIPTION

This disclosure describes a database table structure and a query translation tool that allow a user to define and use custom tags without adding new columns to existing tables in the database, in particular embodiments. Generally, when created, the tables include empty columns that are reserved for custom tags. When a user creates a custom tag, the query translation tool creates a mapping between the name of the custom tag and the name of the reserved column. The query translation tool can then translate between the custom tag name and the reserved column name when they appear in requests, queries, and responses (e.g., to populate the reserved column, to query the database table, to respond to queries).

Figure 1:
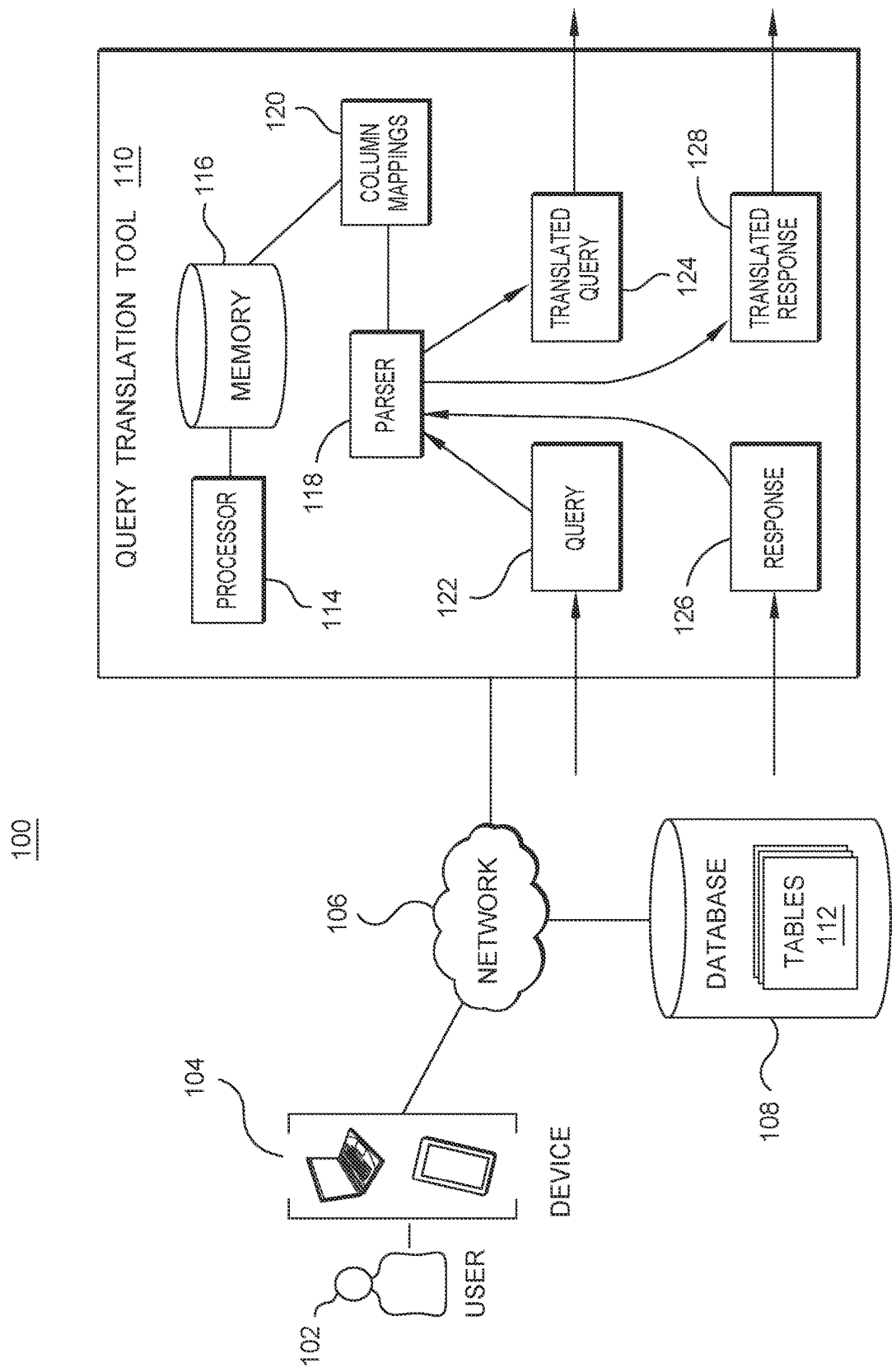
FIG. 1 illustrates an example system.

With reference now to FIG. 1, which illustrates an example system 100. As seen in FIG. 1, the system 100 includes a device 104, a network 106, a database 108, and a query translation tool 110. Generally, the system 100 translates between custom tag names and the names of columns that are reserved for custom tags. In this manner, the system 100 allows a user 102 to define custom tags without adding new columns to existing tables in the database 108, in particular embodiments.

The user 102 may use the device 104 to communicate with other components of the system 100. For example, the user 102 may use the device 104 to generate and communicate a query to search the database 108. The device 104 may communicate the query to the query translation tool 110. Additionally, the device 104 may receive a response to the query from the query translation tool 110. The device 104 includes any suitable device for communicating with components of the system 100 over the network 106. As an example and not by way of limitation, the device 104 may be a computer, a laptop, a wireless or cellular telephone, an electronic notebook, a personal digital assistant, a tablet, or any other device capable of receiving, processing, storing, or communicating information with other components of the system 100. The device 104 may also include a user interface, such as a display, a microphone, keypad, or other appropriate terminal equipment usable by the user 102. The device 104 may include a hardware processor, memory, or circuitry configured to perform any of the functions or actions of the device 104 described herein. For example, a software application designed using software code may be stored in the memory and executed by the processor to perform the functions of the device 104.

The network 106 is any suitable network operable to facilitate communication between the components of the system 100. The network 106 may include any interconnecting system capable of transmitting audio, video, signals, data, messages, or any combination of the preceding. The network 106 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

The database 108 stores one or more tables 112 of information. The database 108 may be a relational database in which one or more of the tables 112 are joined by particular columns in those tables 112. The database 108 may use the information in those columns to reference information in other tables 112 that contain those columns. In this manner, the database 108 may traverse the various tables 112 to gather information. The database 108 may receive a query from a device 104 or a query translation tool 110. The database 108 may respond to that query by retrieving information from one or more of the tables 112. The database 108 may then form a response and communicate the response to the device 104 or the query translation tool 110.

Generally, some of the tables 112 in the database 108 may include columns that are reserved for custom tags created by a user 102 after the tables 112 have been created. These reserved columns may be empty initially and may be assigned a default name. As the user 102 defines custom tags, custom tag information may be populated into one or more of these empty reserved columns. When a user 102 removes or deletes a custom tag, information may be removed from these columns to return them to an empty state. In some database implementations, the reserved columns may be empty except for an entry that includes the default name of the column. These columns are still considered empty even though they contain an entry for the name of the column. Generally, a column may be considered empty if it has no user data (e.g., data other than metadata that is descriptive of the column or table 112, such as a column name) in the column. In particular embodiments, by providing empty columns that are reserved for custom tags, the database 108 allows the user 102 to define custom tags without adding new columns to one or more of the tables 112 in the database 108, which may be a costly operation.

The query translation tool 110 translates between custom tag names and the names of reserved columns in the database 108. As seen in FIG. 1, the query translation tool 110 includes a processor 114 and a memory 116, which are configured to perform any of the functions or actions of the query translation tool 110 described herein. In particular embodiments, the query translation tool 110 allows the user 102 to define and use custom tags without adding new columns to the tables 112 in the database 108.

The processor 114 is any electronic circuitry, including, but not limited to microprocessors, application specific integrated circuits (ASIC), application specific instruction set processor (ASIP), and/or state machines, that communicatively couples to memory 116 and controls the operation of the query translation tool 110. The processor 114 may be 816-bit, 16-bit, 32-bit, 64-bit or of any other suitable architecture. The processor 114 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The processor 114 may include other hardware that operates software to control and process information. The processor 114 executes software stored on memory to perform any of the functions described herein. The processor 114 controls the operation and administration of the query translation tool 110 by processing information (e.g., information received from the devices 104, network 106, and memory 116). The processor 114 may be a programmable logic device, a microcontroller, a microprocessor, any suitable processing device, or any suitable combination of the preceding. The processor 114 is not limited to a single processing device and may encompass multiple processing devices.

The memory 116 may store, either permanently or temporarily, data, operational software, or other information for the processor 114. The memory 116 may include any one or a combination of volatile or non-volatile local or remote devices suitable for storing information. For example, the memory 116 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in the memory 116, a disk, a CD, or a flash drive. In particular embodiments, the software may include an application executable by the processor 114 to perform one or more of the functions described herein.

The query translation tool 110 implements a parser 118 that parses text within search queries and search responses. Generally, the parser 118 identifies the names of custom tags or reserved columns in the search queries and search responses. After identifying the custom tag names or reserved column names, the parser 118 translates between the custom tag names and the reserved column names. For example, the parser 118 may replace a custom tag name with a reserved column name corresponding to that custom tag. As another example, the parser 118 may replace a reserved column name with a custom tag name corresponding to that reserved column.

The parser 118 identifies custom tag names and reserved column names based on column mappings 120. The column mappings 120 may be stored in the memory 116. When a custom tag is created or deleted, the query translation tool 110 may update the column mappings 120 to reflect the new custom tag or the removed custom tag. Generally, each custom mapping 120 describes a relationship or link between a custom tag name and the name of a reserved column in the database 108. The parser 118 may examine these links or relationships to identify custom tag names or reserved column names in search queries and search responses.

The query translation tool 110 receives a query 122 from a device 104. The query 122 may include a request to search the tables 112 of database 108. The query 122 may include text that focuses the search on particular tables 112 or particular columns of the tables 112. The query translation tool 110 may parse the query 122 using the parser 118 to identify the names of custom tags or the names of reserved columns in the query 122. The parser 118 may reference the column mappings 120 to identify the custom tag names or the names of reserved columns in the query 122. If the parser 118 identifies the name of a custom tag in the query 122, the parser 118 translates the custom tag name into the corresponding reserved column name. For example, the parser 118 may replace the custom tag name with the reserved column name. The translation may produce a translated query 124. The query translation tool 110 then issues the translated query 124 rather than the query 122. The query translation tool 110 may communicate the translated query 124 to the database 108 to issue the translated query 124.

The database 108 may receive the translated query 124 and retrieve requested information from the tables 112 in the database 108. The database 108 may then form a response 126 that includes the retrieved information and communicate the response 126 to the query translation tool 110. The query translation tool 110 may parse the response 126 using the parser 118. The parser 118 may parse the response 126 to identify custom tag names or reserved column names in the response 126. The parser 118 may use the column mappings 120 to identify the custom tag names or reserved column names. For example, if the parser 118 identifies a reserved column name in the response 126, the parser 118 may translate the reserved column name into a corresponding custom tag name indicated by the column mappings 120. The parser 118 may replace the reserved column name with the corresponding custom tag name to perform the translation. The translation may produce a translated response 128. The query translation tool 110 may communicate the translated response 128 rather than the response 126 to the device 104. The device 104 may receive the translated response 128 and display the translated response 128 to the user 102. In this manner, the query translation tool 110 allows the user 102 to request custom tag information without adding new columns to the tables 112 in the database 108 in certain embodiments.

Figure 2:
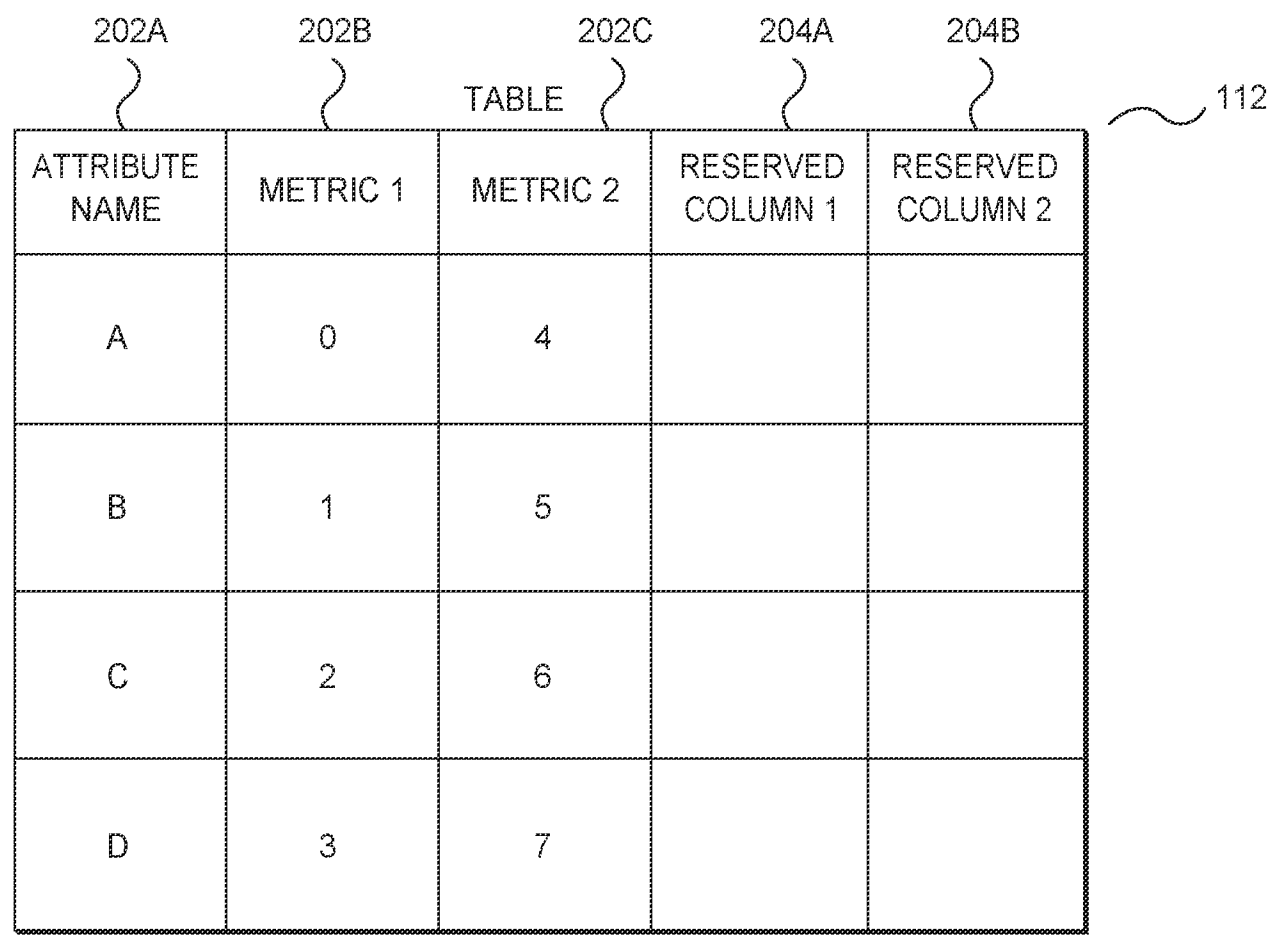

FIG. 2 illustrates an example table 112 in the system 100 of FIG. 1. As seen in FIG. 2, the table 112 includes one or more columns 202 and 204. Generally, the columns 202 include user data and the columns 204 are reserved for custom tags. In the example of FIG. 2, the table 112 includes columns 202A, 202B, and 202C. The column 202A includes attribute names: A, B, C, and D. The column 202B includes the values of a first metric. These values are 0, 1, 2, and 3 respectively for the attributes A, B, C, and D. The column 202C includes values of a second metric. The values of this second metric are 4, 5, 6, and 7 respectively for the attributes A, B, C, and D.

The table 112 also includes reserved columns 204A and 204B. As seen in FIG. 2, the reserved columns 204A and 204B are initially empty because they do not include user data such as the columns 202A, 202B, and 202C. In certain database implementations, the reserved columns 204A and 204B may be empty except for an entry that includes the name of the reserved columns 204A and 204B. For example, if the table 112 in FIG. 2 followed these database implementations, the reserved columns 204A and 204B may be empty except for entries that say "Reserved Column 1" and "Reserved Column 2." Although these columns 204A and 204B include an entry for the column name, they are still considered empty because they do not contain user data.

As a user 102 creates custom tags, one or more of the reserved columns 204A and 204B may be populated with user data, such as custom tag information provided by the user 102. In this manner, the user 102 may define custom tags without adding new columns to the table 112. Instead, the custom tag information may be added into the reserved columns 204, which reduces the amount of computing resources used relative to creating a new column in the table 112 in particular embodiments.

Figure 3:
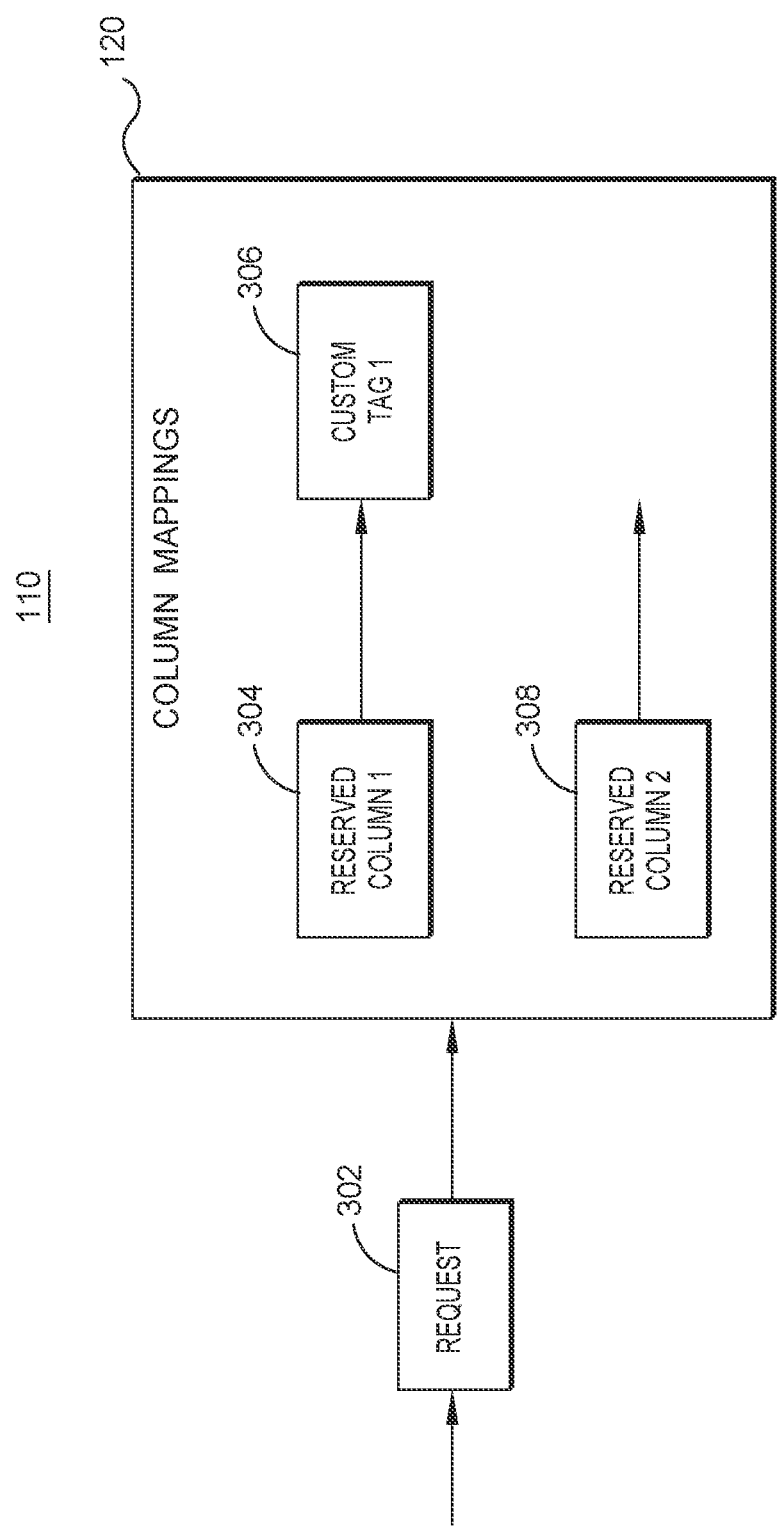
FIG. 3 illustrates generating or editing column mappings in the system of FIG. 1.

FIG. 3 illustrates generating or editing column mappings 120 in the system 100 of FIG. 1. Generally, the query translation tool 110 may update the column mappings 120 based on custom tag requests provided by the user 102.

The query translation tool 110 receives a request 302 from the user 102 or the device 104. The request 302 may indicate a request to add or remove a custom tag. In response to the request 302, the query translation tool 110 updates one or more of the column mappings 120 in the query translation tool 110.

For example, the request 302 may be a request to create a new custom tag. In response to the request 302, the query translation tool 110 may generate a new column mapping 120 that links a name of a reserved column to the name of the custom tag. In the example of FIG. 3, the query translation tool 110 may link the name 304 of a reserved column (e.g., "Reserved Column 1") with a name 306 of a custom tag (e.g., "Custom Tag 1"). The query translation tool 110 may subsequently refer to this link or relationship to translate between the name 304 of the reserved column and the name 306 of the custom tag when parsing received queries 122 and responses 126.

As another example, the request 302 may include a request to delete or remove a custom tag. In response to the request 302, the query translation tool 110 may remove a custom mapping 120 from the custom mappings 120. For example, the query translation tool 110 may remove a link or a relationship between a name 308 of a reserved column (e.g., "Reserved Column 2") and the name of a custom tag such that the name 308 of the reserved column is no longer linked with the name of a custom tag. Additionally, the query translation tool 110 or the database 108 may remove user data from the reserved column. As a result, the unlinked name 308 indicates that the corresponding reserved column is empty and that no custom tag is linked to the reserved column.

FIG. 4 illustrates an example table 112 in the system 100 of FIG. 1. As seen in FIG. 4, the table 112 is the example table 112 from FIG. 2 except in FIG. 4, the table 112 has entries populated in the reserved column 204A. The query translation tool 110 may have populated the entries in the reserved column 204A in response to a request 302 to create a custom tag. For example, the request 302 may have included information about the custom tag that can be used to populate the entries of the reserved column 204A. In the example of FIG. 4, the reserved column 204A is populated with the entries 8, 9, 10, and 11 respectively for the attributes A, B, C, and D. In certain embodiments, the user 102 may supply user data to populate the reserved column 204A separate from the request 302. The query translation tool 110 may create the column mapping 120 that links the reserved column 204A to the custom tag in response to the request 302. After the linking, the user 102 may supply the user data for the custom tag to populate the reserved column 204A.

If the query translation tool 110 receives a subsequent request 302 to remove or delete the custom tag corresponding to the reserved column 204A, then the query translation tool 110 may delete the populated entries in the reserved column 204A to return the table 112 back to the state shown in FIG. 2. Additionally, the query translation tool 110 may remove the link or relationship between the name 304 of the reserved column 204A and the name 306 of the custom tag in the column mapping 120. In this manner, the query translation tool 110 may add or remove custom tags without adding or removing columns from the table 112 in particular embodiments.

Figure 5:
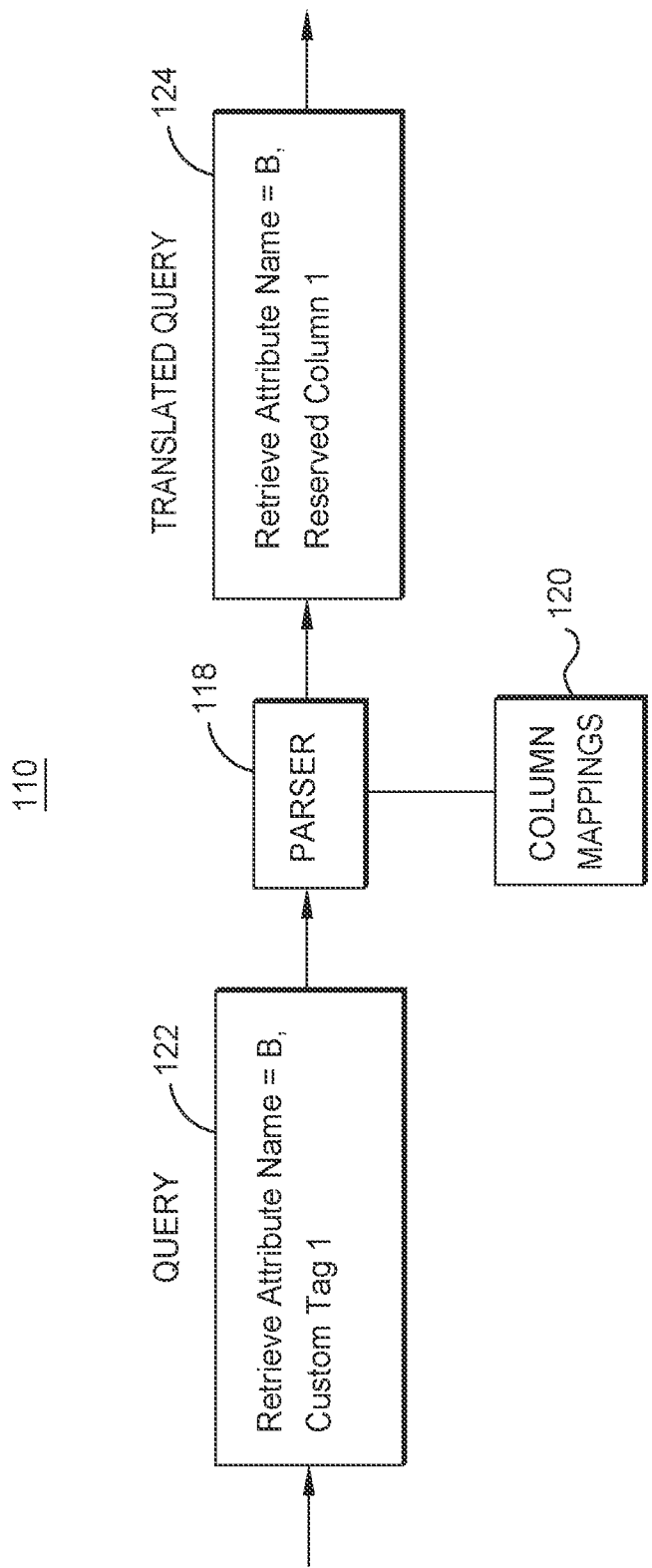
FIG. 5 illustrates an example query translation in the system of FIG. 1.

FIG. 5 illustrates an example query translation in the system 100 of FIG. 1. Generally, the query translation tool 110 performs the query translation. In particular embodiments, by performing the query translation, the query translation tool 110 allows the user 102 to define and use custom tags without adding new columns to a table 112, which may be a resource intensive operation.

As seen in FIG. 5, the query translation tool 110 receives a query 122. The query 122 may request that certain information be retrieved from a table 112 in the database 108. In the example of FIG. 5, the query 122 requests a "Custom Tag 1" for the attribute with the attribute name 'B.'

The query translation tool 110 may parse the query 122 using the parser 118. The parser 118 may identify custom tag names in the query 122 based on the column mappings 120 (e.g., the column mappings 120 shown in FIG. 3). For example, the column mappings 120 may identify the custom tag names that are linked to reserved column names. The parser 118 may match the custom tag names in the column mappings 120 with the names that appear in the query 122 to identify the custom tags in the query 122.

If the parser 118 identifies a custom tag name in the query 122, the parser 118 may translate the custom tag name in the query 122 into the reserved column name corresponding to the custom tag name based on the column mappings 120. For example, the parser 118 may replace the custom tag name with the name of the reserved column. The parser 118 may produce a translated query 124 based on the translation. In the example of FIG. 5, the translated query 124 is the same as the query 122 except the custom tag name has been replaced with the name of the reserved column. The query translation tool 110 then issues the translated query 124 against the database 108. If the query translation tool 110 had instead issued the query 122 against the database 108, the database 108 would likely return an error because the database 108 would not recognize the custom tag name in the query 122.

Figure 6:
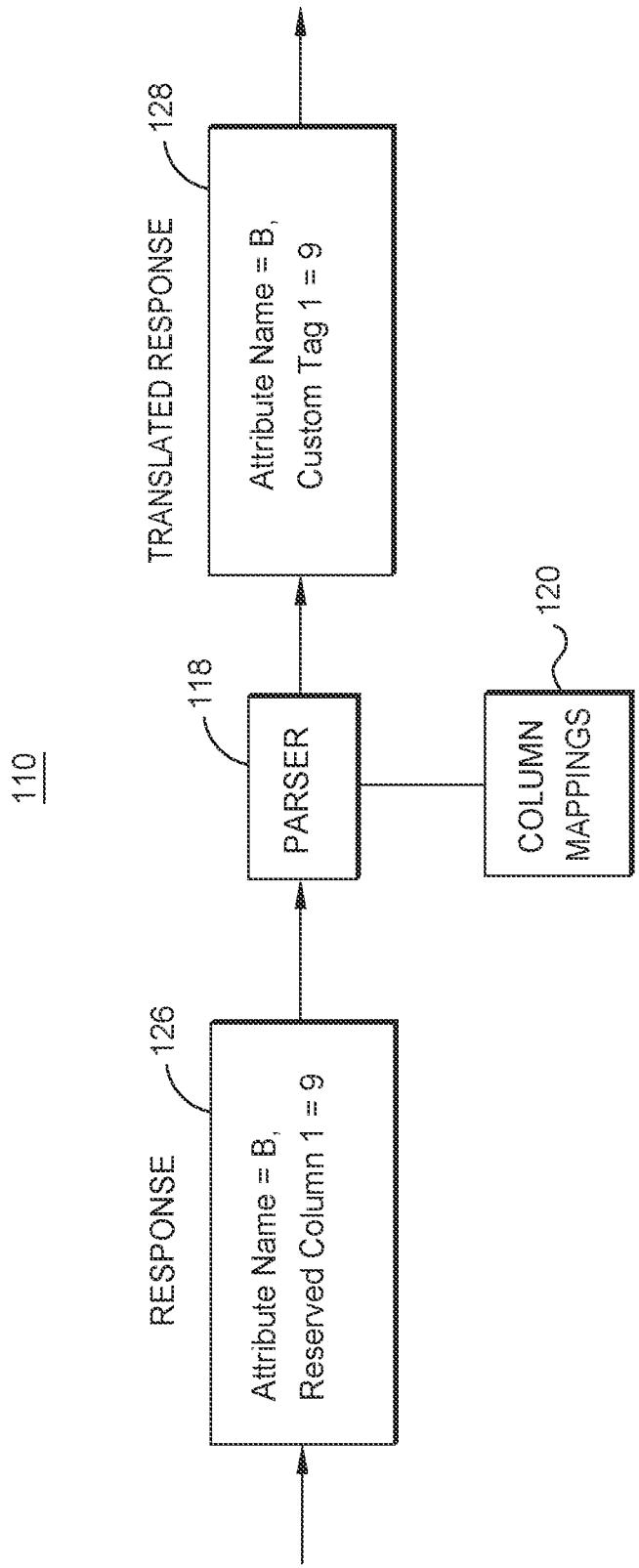
FIG. 6 illustrates an example response translation in the system of FIG. 1.

FIG. 6 illustrates an example response translation in the system 100 of FIG. 1. Generally, the query translation tool 110 performs the response translation. In particular embodiments, by performing the response translation, the query translation tool 110 allows the user 102 to define and use custom tags without adding new columns to the tables 112 of database 108, which may be a resource intensive operation.

The query translation tool 110 receives a response 126 from the database 108. The response 126 may be formed by the database 108 in response to the translated query 124 being issued against the database 108. The response 126 may include the information requested in the translated query 124. In the example of FIG. 6, the response 126 includes the attribute name B and the value in the reserved column 204A corresponding to the attribute B. In this example and as seen in FIG. 4, the corresponding value is 9.

The query translation tool 110 may use the parser 118 to parse the response 126. The parser 118 may parse the response 126 to identify the names of reserved columns based on the column mappings 120 (e.g., the column mappings 120 shown in FIG. 3). For example, the parser 118 may match the names in the response 126 with the names in the column mappings 120 to identify the names of reserved columns that appear in response 126.

If the parser 118 identifies the name of a reserved column in the response 126, the parser 118 may translate the name of the reserved column into the name of a corresponding custom tag based on the column mappings 120. For example, the parser 118 may replace the name of the reserved column with the name of a corresponding custom tag based on the column mappings 120. In the example of FIG. 6, the parser 118 translates the name "Reserved Column 1" into the name "Custom Tag 1" based on the column mappings 120. The translation forms the translated response 128. As seen in FIG. 6, the name "Reserved Column 1" in the response 126 is replaced by the name "Custom Tag 1" in the translated response 128. The query translation tool 110 may communicate the translated response 128 to a user 102 or device 104. For example, the device 104 may display the translated response 128 to be viewed by the user 102. If the query translation tool 110 had instead communicated the response 126, the user 102 may not understand the response 126 because the user 102 would not recognize the name of the reserved column.

Figure 7:
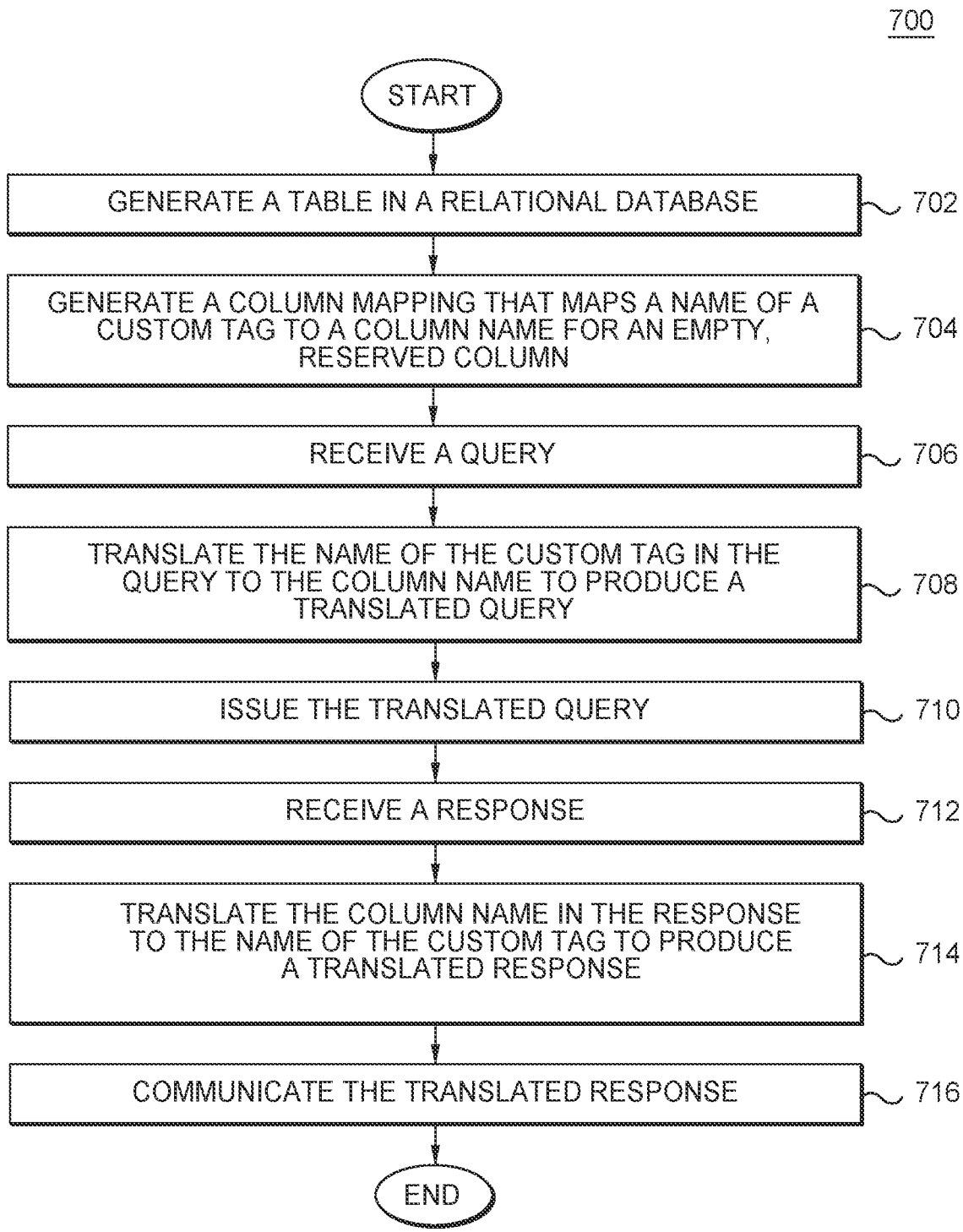
FIG. 7 is a flowchart of an example method in the system of FIG. 1.

FIG. 7 is a flow chart of an example method 700 in the system 100 of FIG. 1. Generally, the query translation tool 110 performs the method 700. In particular embodiments, by performing the method 700, the query translation tool 110 allows the user 102 to define and use custom tags without adding new columns to a table 112 in a database 108 after the table 112 is generated and populated, which reduces or eliminates the computing resources used to add new columns to tables 112.

In step 702, the query translation tool 110 generates a table 112 in a relational database 108. The table 112 may include reserved columns 204 that can be populated with custom tag information. The reserved columns 204 are initially empty. In step 704, the query translation tool 110 generates a column mapping 120 that maps a name of a custom tag to a column name for an empty reserved column 204. The query translation tool 110 may generate this column mapping 120 in response to a request 302 to create a custom tag. The column mapping 120 may indicate the link between the name of the column 204 and the name of the custom tag. Additionally, the query translation tool 110 may populate the entries in the reserved column 204 with custom tag information in response to the request 302.

In step 706, the query translation tool 110 receives a query 122. The query 122 may request custom tag information from the database 108. For example, the query 122 may include the name of a custom tag. In step 708, the query translation tool 110 translates the name of the custom tag in the query 122 to the column name of the reserved column 204 based on the column mapping 120 to produce a translated query 124. For example, the query translation tool 110 may replace the name of the custom tag with the name of the reserved column 204 to produce the translated query 124. The query translation tool may perform this translation based on the relationship in the column mapping 120. In step 710, the query translation tool 110 issues the translated query 124 to the database 108. The database 108 will be able to process the translated query 124 because the database 108 recognizes the name of the reserved column 204 rather than the name of the custom tag.

If the query translation tool 110 cannot locate the name of the custom tag in the column mappings 120, the query translation tool 110 may treat the custom tag name as a column name in the database 108 and issue the query 122 without translation. If the database 108 cannot process the query 122 because the database 108 does not recognize the custom tag name, then the database 108 will return an error. The query translation tool 110 may then forward the response to the user 102 or device 104.

In step 712, the query translation tool 110 receives a response 126 from the database 108. The database 108 may form the response 126 based on the information retrieved in response to the translated query 124. The response 126 may include the name of the reserved column 204 and the requested custom tag information. In step 714, the query translation tool 110 translates the column name in the response 126 to the name of the custom tag to produce a translated response 128. For example, the query translation tool 110 may replace the name of the reserved column 204 in the response 126 with the name of the custom tag to produce the translated response 128. In step 716, the query translation tool 110 communicates the translated response 128 to a user 102 or device 104. The device 104 may display the translated response 128. Because the translated response 128 includes the name of the custom tag rather than the name of the reserved column 204, the user 102 will recognize and understand the translated response 128.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method comprising:
generating a table in a relational database, the table comprising an empty column reserved for a custom tag, the column having a default column name;
in response to an instruction to create the custom tag, generating a column mapping that maps a name of the custom tag to the column name, the column mapping is stored outside the relational database and is used by a parser to translate between the name of the custom tag and the column name; and in response to an instruction to delete the custom tag, removing every entry from the column except the column name and deleting the column mapping.

2. The method of claim 1, further comprising:
parsing, by the parser, a received search query for the relational database to identify the name of the custom tag in the search query;
in response to identifying the name of the custom tag in the search query, translating, based on the column mapping, the name of the custom tag in the search query into the column name to produce a translated query; and
issuing the translated query to the relational database rather than the search query.

3. The method of claim 1, further comprising:
parsing, by the parser, a received response from the relational database to identify the column name in the response;
in response to identifying the column name in the response, translating, based on the column mapping, the column name into the name of the custom tag to produce a translated response; and
displaying the translated response rather than the received response.

4. The method of claim 1, wherein the table comprises a second column comprising user data.

5. The method of claim 1, further comprising populating an entry in the column in response to an instruction to add the entry to the column.

6. The method of claim 1, wherein the table comprises a plurality of reserved columns.

7. An apparatus comprising:
a memory; and
a hardware processor communicatively coupled to the memory, the hardware processor configured to:
generate a table in a relational database, the table comprising an empty column reserved for a custom tag, the column having a default column name;
in response to an instruction to create the custom tag, generate a column mapping that maps a name of the custom tag to the column name, the column mapping is stored outside the relational database and is used by a parser to translate between the name of the custom tag and the column name; and
in response to an instruction to delete the custom tag, remove every entry from the column except the column name and delete the column mapping.

8. The apparatus of claim 7, wherein the hardware processor is further configured to:
parse, by the parser, a received search query for the relational database to identify the name of the custom tag in the search query;
in response to identifying the name of the custom tag in the search query, translate, based on the column mapping, the name of the custom tag in the search query into the column name to produce a translated query; and
issue the translated query to the relational database rather than the search query.

9. The apparatus of claim 7, wherein the hardware processor is further configured to:
parse, by the parser, a received response from the relational database to identify the column name in the response;
in response to identifying the column name in the response, translate, based on the column mapping, the column name into the name of the custom tag to produce a translated response; and display the translated response rather than the received response.

10. The apparatus of claim 7, wherein the table comprises a second column comprising user data.

11. The apparatus of claim 7, wherein the hardware processor is further configured to populate an entry in the column in response to an instruction to add the entry to the column.

12. The apparatus of claim 7, wherein the table comprises a plurality of reserved columns.

13. A system comprising:
a relational database; and
a query translation tool configured to:
generate a table in the relational database, the table comprising an empty column reserved for a custom tag, the column having a default column name;
in response to an instruction to create the custom tag, generate a column mapping that maps a name of the custom tag to the column name, the column mapping is stored outside the relational database and is used by a parser to translate between the name of the custom tag and the column name; and
in response to an instruction to delete the custom tag, remove every entry from the column except the column name and delete the column mapping.

14. The system of claim 13, wherein the query translation tool is further configured to:

parse, by the parser, a received search query for the relational database to identify the name of the custom tag in the search query;

in response to identifying the name of the custom tag in the search query, translate, based on the column mapping, the name of the custom tag in the search query into the column name to produce a translated query; and issue the translated query to the relational database rather than the search query.

15. The system of claim 13, wherein the query translation tool is further configured to:

parse, by the parser, a received response from the relational database to identify the column name in the response;

in response to identifying the column name in the response, translate, based on the column mapping, the column name into the name of the custom tag to produce a translated response; and display the translated response rather than the received response.

16. The system of claim 13, wherein the table comprises a second column comprising user data.

17. The system of claim 13, wherein the query translation tool is further configured to populate an entry in the column in response to an instruction to add the entry to the column.

\* \* \* \* \*